United States Patent [19]

Ohsaki et al.

[11] Patent Number: 4,988,580
[45] Date of Patent: Jan. 29, 1991

[54] FUEL CELL POWER GENERATING SYSTEM

[75] Inventors: Kozo Ohsaki, Chiba; Mitsuo Okada, Tokyo; Shima Kazumi, Chiba, all of Japan

[73] Assignee: Toyo Engineering Corporation, Tokyo, Japan

[21] Appl. No.: 424,890

[22] Filed: Oct. 20, 1989

[30] Foreign Application Priority Data

Oct. 26, 1988 [JP] Japan .................. 63-270264

[51] Int. Cl.⁵ .............................................. H01M 8/06
[52] U.S. Cl. ........................................ 429/19; 429/21; 429/34; 204/DIG. 4
[58] Field of Search ............... 429/19, 21, 34, 35, 429/38, 39; 204/DIG. 4

[56] References Cited

U.S. PATENT DOCUMENTS

| 4,100,051 | 7/1978 | Kilby et al. ............... 429/21 X |
| 4,534,833 | 8/1985 | Carr et al. ................ 429/21 X |
| 4,766,044 | 8/1988 | Sederquist ................... 429/19 |
| 4,816,353 | 3/1989 | Wertheim et al. .............. 429/19 |
| 4,826,741 | 5/1989 | Aldhart et al. ............... 429/19 |

Primary Examiner—Stephen J. Kalafut
Attorney, Agent, or Firm—Flynn, Thiel, Boutell & Tanis

[57] ABSTRACT

A fuel cell power generating system comprising a central hydrogen-generating plant, a plurality of fuel cell power generating units installed respectively at the sites of power demand for on-site power generation, and piping comprising a main pipe connected to the hydrogen-generating plant, branch pipes connecting the fuel cell power generating units to the main pipe, and valves for regulating the pressure and flow rate of hydrogen gas according to the operating condition of the fuel cell power generating units. The fuel cell power generating units are operated according to power demand, and the surplus hydrogen gas is stored in the piping at an elevated pressure to supplement the capacity of the hydrogen-generating plant when the hydrogen gas demand of the fuel cell power generating units exceeds the capacity of the hydrogen-generating plant. The hydrogen-generating plant is able to operate continuously in the steady state for efficient hydrogen gas generation, while the operation of the fuel cell power generating units is controlled according to power demand.

6 Claims, 1 Drawing Sheet

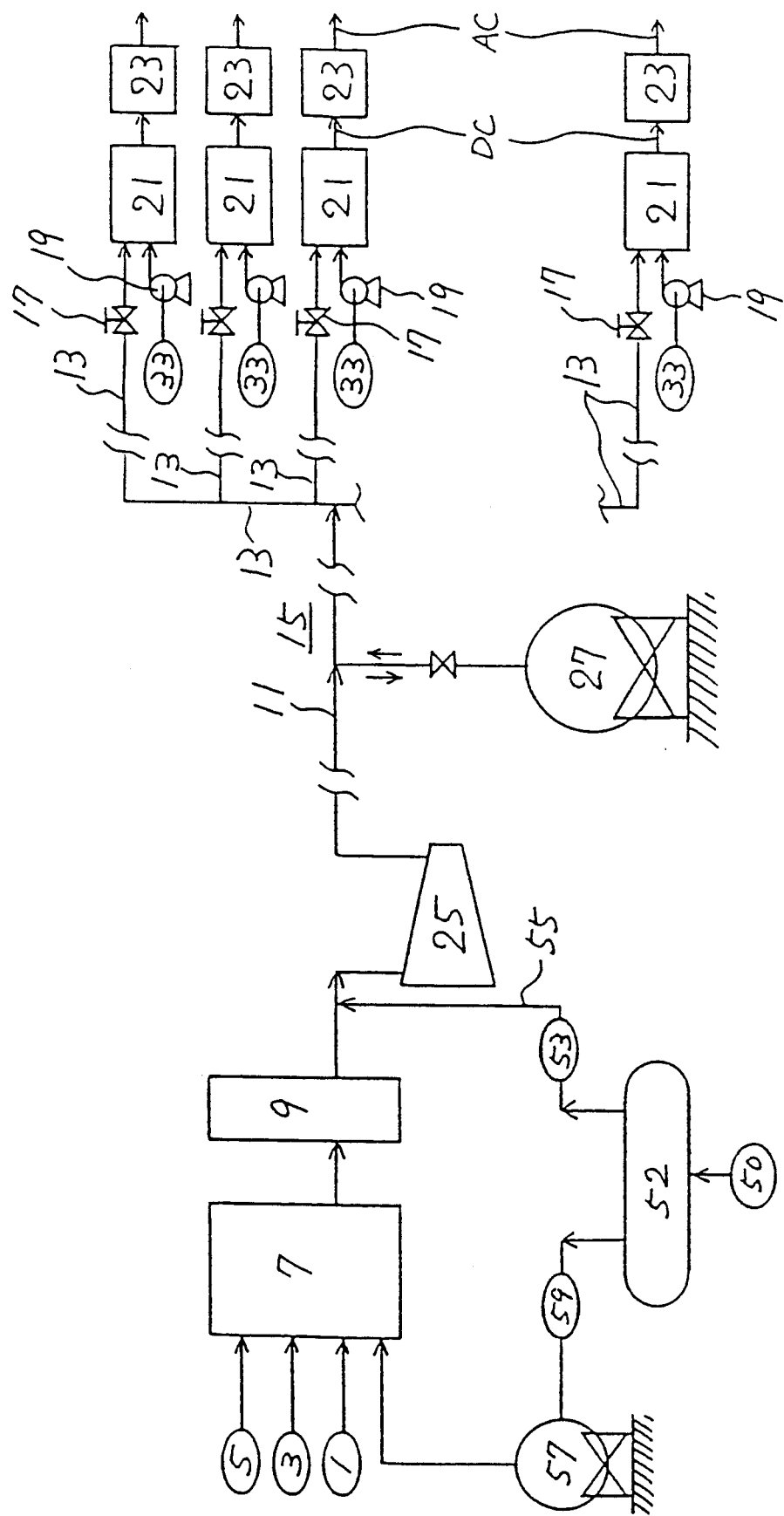

FUEL CELL POWER GENERATING SYSTEM

BACKGROUND OF THE INVENTION

1. Field of the Invention

The present invention relates to a power generating system including fuel cell power generating units and, more specifically, to a power generating system including fuel cell power generating units using hydrogen gas obtained by reforming natural gas or the like and supplied thereto through piping, capable of smoothly responding to the variation of power demand.

2. Description of the Prior Art

It is generally known to generate electric power by fuel cells using hydrogen gas obtained by reforming a gas, such as natural gas or naphtha. A power generating system comprising the combination of a reforming unit and a fuel cell unit is a convenient means of electric power generation in remote regions and isolated islands.

The fuel cell is made to generate electric power simply by supplying hydrogen and oxygen (air). The fuel cell converts the chemical energy of a fuel directly into electric energy in a continuous process at an efficiency higher than that of other power generating systems, such as a so-called combined cycle power generating system employing, in combination, a gas turbine and a steam turbine, is capable of readily responding to the variation of power demand.

On the other hand, the reformer which converts natural gas or the like into gas containing hydrogen gas as a principal component by using a reforming medium, such as oxygen gas or steam, needs a comparatively long time for start-up, namely, the time required for the reformer to reach a steady state, and a comparatively long time for shut-down, namely, the time required for the reformer to change from a steady state to a stop, and, hence, the reformer is unable to operate at a high efficiency unless the reformer is kept continuously in the steady state.

Power demand is variably daily, weekly, monthly as well as between seasons. The daily power demand, for example, has a peak power demand in the afternoon, a minimum power demand between midnight and morning, and an average power demand between the peak power demand and the minimum power demand. Since it is difficult or disadvantageous to store electric energy, power plants must have a capacity corresponding to the peak power demand, which necessarily entails loss in power transmission.

Accordingly, even a fuel cell power generating system including a fuel cell unit capable of generating electric power at an appropriate rate in response to the variation of power demand is not economically effective when the fuel cell power generating system employs a reformer, which ordinarily includes a purifier or purification unit, having a capacity corresponding to the peak power demand to cope with the variation of power demand, because such a fuel cell power generating system requires a large investment and is unable to operate efficiently.

The greater is the capacity of the reformer or the longer the period of operation of the reformer in the steady state, the higher is the efficiency of the reformer. Additionally, techniques relating to the reformer have almost completely been established and have been proved in chemical plants. However, it is very difficult to quickly start up or shut down a reformer having a smaller capacity or to regulate the hydrogen-generating rate of the reformer according to the condition of the individual fuel cell power generating units. Furthermore, the reformer, as a chemical plant, needs additional space for installation and requires skilled operators, which an economically disadvantageous.

SUMMARY OF THE INVENTION

Accordingly, it is an object of the present invention to provide a fuel cell power generating system that operates on hydrogen obtained by reforming natural gas or the like, requiring a reformer having a comparatively small capacity as compared with the peak power demand of the associated load, and capable of efficiently responding to the variation of power demand and making the reformer operate at a maximum efficiency.

According to the present invention, a reformer operates continuously in the steady state, and hydrogen generated by the reformer is stored in piping between the reformer and the fuel cell power generating units or in the piping and a storage tank connected to the piping to supply hydrogen to the fuel cell power generating units according to the operating condition of the fuel cell power generating units.

In one aspect of the present invention, a fuel cell power generating system converts a feedstock by a reformer into a gas containing hydrogen as a principal component, obtains substantially pure hydrogen gas by purifying the gas by a purification process, distributes the hydrogen gas through piping to a plurality of remote fuel cell power generating units, stores the surplus hydrogen gas in the piping, and operates the fuel cell power generating units on the hydrogen gas according to the variation of power demand to supply electric power.

In another aspect of the present invention, a fuel cell power generating system comprises: a hydrogen-generating plant comprising a reformer for converting a fuel source into a gas containing hydrogen as a principal component, and a purifier connected to the reformer to purify the gas produced by the reformer to obtain substantially pure hydrogen gas; a plurality of fuel cell power generating units that operate on hydrogen; and hydrogen gas supply piping including a main pipe connected to the purifier, and a plurality of branch pipes interconnecting the main pipe and the fuel cell power generating units, and valves provided near the fuel cell power generating units on the branch pipes to reduce the pressure of the hydrogen gas, to shut off the branch pipes and to regulate the flow rate of the hydrogen gas.

The hydrogen gas is stored temporarily in the piping, and the hydrogen gas is supplied to the fuel cell power generating units according to the variation of the operating condition of the fuel cell power generating units corresponding to the variation of power demand.

The present invention has the following advantages.

1. Gas producing feedstocks are received collectively and hydrogen gas is generated by a hydrogen-generating plant having a large capacity at a comparatively high efficiency.

2. The hydrogen-generating plant operates continuously in a steady state at a high efficiency, while the generated hydrogen gas is stored in piping and is supplied properly to the fuel cell power generating units according to the operating condition of the fuel cell power generating units varying according to the variation of power demand.

3. The centralized supply of hydrogen gas to the distributed fuel cell power generating units saves space for installing small hydrogen-generating plants individually for the distributed fuel cell power generating units to enable the effective utilization of the expensive space at the site of power demand, such as an urban district or the central area of a city, for other purposes.

4. The large central hydrogen-generating plant requires less labor and cost for operation and maintenance than distributed small hydrogen-generating plants, which reduces the cost of power remarkably.

5. Energy loss in distributing the hydrogen gas generated by the centralized hydrogen-generating plant to the fuel cell power generating units installed at the site of power demand and transmitting electric energy generated by the fuel cell power generating units to the load at the site of power demand is less than the energy loss in transmitting electric energy from a remote power generating station to the site of power demand.

6. The centralized supply of hydrogen gas to the distributed fuel cell power generating units reduces the number of hydrogen-generating plants, and the supply of hydrogen gas having the smallest specific gravity with reference to air is safer than the supply of other fuel gases and liquid fuels having specific gravities higher than that of hydrogen gas, because hydrogen gas disperses readily into the atmosphere in case the hydrogen gas leaks by any possibility.

The above and other objects, features and advantages of the present invention will become more apparent from the following description taken in conjunction with the single drawing, which is a block diagram of a fuel cell power generating system embodying the present invention.

DETAILED DESCRIPTION OF THE PREFERRED EMBODIMENT

Techniques associated with fuel cell power generating systems will be described prior to the description of a fuel cell power generating system in a preferred embodiment according to the present invention.

It is generally known to convert gaseous or liquid hydrocarbons, such as natural gas and naphtha, liquid alcohols, such as methanol, hydrocarbons containing high amounts of nonvolatile components and which are nonfluid or of low fluidity at an ordinary temperature, such as heavy oils, solid hydrocarbons, such as coal, and cellulose hydrocarbons, such as biomass, into gases containing hydrogen as a principal component by reformers using a reforming medium, such as oxygen gas, air, steam and carbon monoxide.

According to the present invention, the reforming process operates under atmospheric or pressurized condition, preferably at a pressure in the range of 5 to 50 $kg/cm^2G$, more preferably in the range of 10 to 40 $kg/cm^2G$, and most preferably in the range of 10 to 30 $kg/cm^2G$. An excessively low pressure, in general, reduces the efficiency of the reforming process. Although advantageous in respect of the efficiency of the reforming process, an excessively high pressure entails a sharp increase in the cost of equipment.

Desirably, the reforming system is operated so that hydrogen gas is supplied to the purifier at a pressure substantially not lower than the operating pressure of the fuel cells of the fuel cell power generating units to supply the hydrogen gas through the piping from the purifier to the fuel cell power generating units.

The gas obtained by the reforming process is purified to obtain a suitable fuel gas for the fuel cells, for example, a gas of not less than 80% by volume hydrogen gas content, by a known purification or purifying process, for example, a membrane filtration process, an adsorption process, such as a pressure swing adsorption process (hereinafter referred to as "PSA process"), or a low-temperature separation process. When necessary, the fuel gas is subjected further to desulfurization, carbon monoxide conversion and methanation.

The aqueous phosphoric acid solution type, the molten carbonate electrolyte type, the solid electrolyte type and the aqueous alkaline solution type are the representative type of fuel cells which convert the chemical energy of a fuel directly into electric energy in a continuous fuel-cell reaction involving the combination of hydrogen (fuel) with oxygen (oxidizing agent), in most cases, air. Generally, the pressures of the hydrogen gas and the oxygen gas in the fuel-cell reaction are in the range of atmospheric pressure to 10 $kg/cm^2G$, in most cases, on the order of 1 to 7 $kg/cm^2G$.

As stated above, the fuel cell generates dc power when hydrogen and oxygen are supplied thereto. Generally, the dc power generated by the fuel cell is converted into ac power by a suitable inverter.

Preferably, energy, such as the heat generated by the fuel-cell reaction, and effective gases, including unused hydrogen, are used for suitable purposes for effective energy utilization.

Hydrogen gas is supplied through piping including a main pipe, branch pipes, and valves provided near the fuel cell power generating units on the branch pipes. The valves reduce the pressure of the hydrogen gas and regulate the flow rate of the same to supply hydrogen gas at an appropriate flow rate and an appropriate pressure to the fuel cell power generating units.

Oxygen gas, in most cases, air or oxygen-enriched air, is supplied through another piping including valves and blowers, which are installed on the site of fuel-cell power generation units or at a remote place.

According to the present invention the piping for supplying hydrogen gas serves as a buffer tank for storing surplus hydrogen gas as well as means for distributing hydrogen gas.

The specific gravity, with reference to air, of hydrogen gas being smaller than those of any other gases, hydrogen gas disperses readily into the atmosphere even if hydrogen gas leaks from the piping by any possibility only if the piping is designed not to hinder the dispersion of hydrogen gas. Therefore, hydrogen gas is safer than other fuel gases.

Preferably, the present invention employs a suitable compressor for boosting the pressure of hydrogen gas in the piping to supply hydrogen gas satisfactorily to the fuel cell power generating units and to store an increased amount of hydrogen gas in the piping.

The pressure of the boosted hydrogen gas is in the range of 10 to 150 $kg/cm^2G$, preferably 15 to 150 $kg/cm^2G$, most preferably 15 to 120 $kg/cm^2G$. Boosting is ineffective if the pressure is excessively low and the cost of the equipment and piping increases sharply if the pressure is excessively high, which is economically disadvantageous.

If the hydrogen gas storage capacity of the piping is insufficient, a hydrogen gas storage tank may be connected to the main pipe or hydrogen gas storage tanks may be connected to the branch pipes to store an increased amount of hydrogen gas and to stabilize the supply hydrogen gas pressure.

PREFERRED EMBODIMENT

A fuel cell power generating system, in a preferred embodiment according to the present invention, will be described hereinafter with reference to the single FIGURE showing the configuration of the fuel cell power generating system.

Referring to the single FIGURE, a fuel gas 1, i.e., a fuel source such as natural gas containing methane as a principal component, air 3 and steam 5 are supplied to a reformer 7 for a so-called steam reforming process. In the primary reforming stage of the steam reforming process, the fuel gas 1 is converted by a catalyst into a primary reformed gas containing hydrogen gas and carbon monoxide gas. Reforming heat is supplied by an external heat source which generates heat by combusting part of the fuel gas or the exhaust gas of the PSA process.

Solid fuel materials, such as coal, and liquid fuel materials, such as heavy oils, can be gasified by a known process, such as the application of external heat or partial oxidation, using gasifying agents, such as steam and oxygen gas.

A mixture of the primary reformed gas, part of the fuel gas and oxygen gas is subjected to a secondary reforming stage, in which the primary reformed gas is reformed further by partial oxidation using internal heat under an adiabatic condition to produce a secondary reformed gas, namely, a gas containing hydrogen and carbon monoxide as principal components.

The reforming process having the adiabatic secondary reforming stage of the partial oxidation method is advantageous because more secondary reformed gas is produced with less consumption of materials.

The secondary reformed gas is stored in a buffer tank, not shown, before purification. A purifier 9 removes gases other than hydrogen gas, such as steam, carbon dioxide, methane, nitrogen and argon, from the secondary reformed gas, for example, by the PSA process to produce a fuel gas, i.e., substantially pure hydrogen gas of not less than 99% purity. Required hydrogen purity is dependent on the type of fuel cell to which the hydrogen gas is supplied; for example, the required hydrogen purity for fuel cells of aqueous phosphoric acid solution type is 80% or above. Accordingly, the operation of the purifier 9 is controlled according to the required hydrogen gas purity. The PSA process is an exemplary purifying process suitable for the present invention and is carried out by a purifying apparatus comprising a plurality of adsorption beds and a pressurizing/depressurizing unit. Ordinarily, the reforming pressure is in the range of 10 to 30 kg/cm$^2$G and, preferably, the pressure of the fuel gas delivered from the purifier 9 corresponds to the reforming pressure in view of the operating efficiency of the purifier 9.

The single reformer 7 and the single purifier 9 may constitute a hydrogen-generating plant. A hydrogen-generating plant comprising a plurality of reformers and a plurality of purifiers, a hydrogen-generating plant comprising a single reformer and a plurality of purifiers, and a hydrogen-generating plant comprising a plurality of reformers and a single purifier ensure more stable hydrogen gas supply.

The hydrogen gas delivered from the purifier 9 is supplied through piping 15 comprising a main pipe 11 and a plurality of branch pipes 13 to fuel cell power generating units 21. The hydrogen gas delivered from the purifier is compressed at a pressure in the range of 15 to 150 kg/cm$^2$G by a compressor 25 provided near the purifier 9 on the main pipe 11. A storage tank 27 is connected to the main pipe 11 to store the hydrogen gas in the piping 15 and the storage tank 27. Valves 17 are provided respectively on the branch pipes 13 connected respectively to the fuel cell power generating units 21 to regulate the pressure and flow rate of the hydrogen gas to be supplied to the corresponding fuel cell power generating units 21. The number of the active fuel cell power generating units 21 is changed according to power demand. Air 33 is supplied to each fuel cell power generating unit 21 by a blower 19 installed near the fuel cell power generating unit 21 at a flow rate proportional to that of the hydrogen gas supplied to the same fuel cell power generating unit 21. The gas pressure in the fuel cells of the fuel cell power generating units 21 is in the range of atmospheric pressure to 7 kg/cm$^2$G.

The dc output power of each fuel cell power generating unit 21 is supplied to the load or user after being converted into ac power of an appropriate voltage and an appropriate frequency by an inverter 23.

Hydrogen gas 53 is generated through electrolysis by an electrolytic hydrogen-generating unit 52 by using the dump power 50 of unneeded capacity of an associated power plant at night or other times, which is scarcely sufficient for pumped-storage power generation, to store the dump power in the hydrogen gas 53. The hydrogen gas 53 is supplied through a pipe 55 connected to the piping 15 at a position on the suction side of the compressor 25. Oxygen gas 59 produced by the electrolytic hydrogen-generating unit 52 in producing the hydrogen gas 53 may be used for suitable purposes. Preferably, the oxygen gas 59 is stored in a storage tank 57 and is used instead of air by the reformer 7. Naturally, the oxygen gas 59 may be supplied through a suitable apparatus to the fuel cell power generating units 21.

EXAMPLE

An exemplary fuel cell power generating system in accordance with the present invention includes a hydrogen-generating plant comprising a single reformer and a single purifier. The hydrogen-generating plant generates hydrogen gas of 99% by volume purity at a hydrogen generating rate of 103,000 Nm$^3$/hr through continuous operation consuming a methane-rich city gas (13A, LHV=9960 kcal/Nm$^3$) at a consumption rate of 40,000 Nm$^3$/hr. This hydrogen generating rate corresponds to the output power of 100 MW of aqueous phosphoric acid solution fuel cell power generating units. This hydrogen gas is supplied, for example, to twenty aqueous phosphoric acid solution fuel cell power generating units each having a capacity of 10 MW (200 MW in total). These twenty fuel cell power generating units are able to supplement the capacity of an associated nuclear or thermal power plant operating in a steady state at full capacity, for example, by 200 MW at the maximum, because the hydrogen gas, unneeded while power demand on the fuel cell power generating units is low, is stored in the piping 15 and the storage tank 27 by increasing the pressure.

The fuel cell power generating system includes piping of 50 km in total length made of high-pressure service carbon steel pipes (14 in., SCH80) of 317.6 mm in inside diameter. The piping is capable of storing approximately 350,000 Nm³ substantially pure hydrogen gas at 25° C. and at 100 kg/cm²G.

The hydrogen-generating plant is sited in the coastal region where the fuel source, such as natural gas, is readily available, the fuel cell power generating units are distributed in the city and the inland points of power demand, and the hydrogen gas generated in the hydrogen-generating plant is supplied through the piping to the fuel cell power generating units.

Although the invention has been described in its preferred form with a certain degree of particularity, many changes and variations are possible therein. It is therefore to be understood that the invention may be practiced otherwise than as specifically described herein without departing from the scope and spirit thereof.

What is claimed is:

1. A fuel cell power generating system comprising:
  a hydrogen-generating plant comprising
    a reformer for converting a fuel substance into a gas containing hydrogen gas as a principal component, and
    a purifier for processing the gas produced by the reformer to obtain substantially pure hydrogen gas;
  a plurality of fuel cell power generating units distributed at sites remote from the hydrogen-generating plant and operated according to power demand; and
  piping for distributing the hydrogen gas generated by the hydrogen-generating plant to the fuel cell power generating units and for storing the hydrogen gas, comprising a main pipe connected to the hydrogen-generating plant, a plurality of branch pipes connecting the fuel cell power generating units to the main pipe, and valves provided on the branch pipes to regulate the pressure and flow rate of the hydrogen gas.

2. A fuel cell power generating system according to claim 1, wherein a compressor is provided between the hydrogen-generating plant and the main pipe of the piping to compress the hydrogen gas at a pressure not lower than the operating pressure of the fuel cells of the fuel cell power generating units.

3. A fuel cell power generating system according to claim 1, wherein an inverter is connected to the output of each of the fuel cell power generating units to convert the dc output power of the fuel cell power generating unit into ac power.

4. A fuel cell power generating system according to claim 1, wherein a hydrogen gas storage tank is connected to the main pipe of the piping.

5. A fuel cell power generating system according to claim 1, wherein an electrolytic hydrogen-generating unit is provided in combination with the hydrogen-generating plant to generate hydrogen gas through electrolysis for the fuel cell power generating units by using the dump electric energy of an associated power plant.

6. A fuel cell power generating system according to claim 5, wherein the oxygen gas generated by the electrolytic hydrogen-generating unit is used as a reforming agent for the reformer.

* * * * *

UNITED STATES PATENT AND TRADEMARK OFFICE
CERTIFICATE OF CORRECTION

PATENT NO. : 4,988,580

DATED : January 29, 1991

INVENTOR(S) : Kozo OHSAKI et al

It is certified that error appears in the above-identified patent and that said Letters Patent is hereby corrected as shown below:

On the title page, at item [75] change the name of the third inventor from "Shima Kazumi" to ---Kazumi Shima---.

Signed and Sealed this

Twenty-first Day of July, 1992

Attest:

DOUGLAS B. COMER

*Attesting Officer*  *Acting Commissioner of Patents and Trademarks*